(12) United States Patent
Lin

(10) Patent No.: US 9,555,666 B2
(45) Date of Patent: Jan. 31, 2017

(54) ASSEMBLY TOOL FOR WHEEL HUB

(71) Applicant: SHOU KING ENTERPRISE CO., LTD, Taichung (TW)

(72) Inventor: Ching-Chou Lin, Taichung (TW)

(73) Assignee: SHOU KING ENTERPRISE CO., LTD., Taichung (TW)

(*) Notice: Subject to any disclaimer, the term of this patent is extended or adjusted under 35 U.S.C. 154(b) by 20 days.

(21) Appl. No.: 14/501,056

(22) Filed: Sep. 30, 2014

(65) Prior Publication Data

US 2016/0089931 A1    Mar. 31, 2016

(51) Int. Cl.
*B23P 19/04* (2006.01)
*B60B 31/00* (2006.01)

(52) U.S. Cl.
CPC ............ *B60B 31/00* (2013.01); *B60B 2320/10* (2013.01)

(58) Field of Classification Search
USPC .......................................................... 29/240
See application file for complete search history.

(56) References Cited

U.S. PATENT DOCUMENTS

| 2,565,961 | A | * | 8/1951 | Godfrey | B25B 13/465 |
| | | | | | 192/43 |
| 3,511,118 | A | * | 5/1970 | Mitchell | F16B 23/00 |
| | | | | | 411/401 |
| 5,017,079 | A | * | 5/1991 | Reynolds | F16B 23/0061 |
| | | | | | 411/402 |
| 6,035,746 | A | * | 3/2000 | Lin | B25B 13/467 |
| | | | | | 81/57.14 |
| 6,665,918 | B1 | * | 12/2003 | Williams | B25B 27/023 |
| | | | | | 29/252 |
| 6,976,408 | B2 | * | 12/2005 | Chen | B25B 13/463 |
| | | | | | 81/58 |
| 7,267,027 | B2 | * | 9/2007 | Bertani | G05G 1/10 |
| | | | | | 16/441 |
| 7,380,481 | B2 | * | 6/2008 | Barnett | B25B 13/06 |
| | | | | | 81/60 |
| 8,806,987 | B2 | * | 8/2014 | Chen | B25B 13/463 |
| | | | | | 81/63.1 |
| 9,175,730 | B2 | * | 11/2015 | Haas | F16D 1/02 |
| 2007/0250997 | A1 | * | 11/2007 | McDonald | A47K 13/242 |
| | | | | | 4/253 |
| 2010/0024607 | A1 | * | 2/2010 | Thompson | B25B 23/0021 |
| | | | | | 81/63.1 |
| 2010/0206021 | A1 | * | 8/2010 | Tribout | B62H 5/001 |
| | | | | | 70/233 |
| 2013/0126197 | A1 | | 5/2013 | Lisle | |

* cited by examiner

*Primary Examiner* — Alvin Grant
(74) *Attorney, Agent, or Firm* — Raymond Y. Chan; David and Raymond Patent Firm

(57) ABSTRACT

An assembly tool for assembly and replacement of bolts on a wheel hub is revealed. The tool includes a first tool set and a second tool set. The first tool set has a base and a fastener. The base is a circular body with a receiving part. A pad is disposed on the receiving part and a bearing is arranged under the pad. The fastener includes a hexagonal head, an enlarged part, a cylindrical part and an axial hole arranged with a thread. The second tool set has a first arm and a second arm pivotally connected to each other. A wheel bolt is pressed into the wheel hub by the first tool set while the wheel hub is positioned by the first and second arms of the second tool set fastened with the wheel bolts of the wheel hub for convenient assembly of the wheel bolts.

8 Claims, 5 Drawing Sheets

ASSEMBLY TOOL FOR WHEEL HUB

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an assembly tool, especially to an assembly tool for mounting a plurality of wheel bolts on a wheel hub of vehicles such as cars or trucks. The structure of the wheel bolt is different from general bolt so that special assembly tools are required. The present invention provides a convenient, fast and labor-saving assembly tool.

Description of Related Arts

The special wheel bolt for cars or trucks is a hexagon bolt. In order to prevent falling off, the bolts on the wheel have specific design. The wheel bolt has a head. The head is extended to form an expansion part. The expansion part is extended to form a threaded rod. The threaded rod can be engaged with different fasteners. The diameter of the threaded rod is smaller than that of the expansion part while the diameter of the expansion part is smaller than that of the head. The expansion part is a tapered cylinder. The design of the wheel bolt is base on that the expansion part can be pressingly mounted in an assembly hole of the wheel. The bolt with such design can replace conventional wheel bolts available now for preventing falling off and matching various kinds of wheels/rims. However, such bolt is vigorously pressed and fixed in the wheel hub by a tool. After the vehicle being used for a long period of time, the wheel bolt may be rusted, deformed or damaged. For driver's safety, the wheel bolts on the wheel hub must be replaced periodically.

For replacement of the wheel bolts, vehicle maintenance and repair technicians need to remove the whole wheel together with the wheel hub from the axle shaft. This is labor-and-time-consuming process. The wheel bolts are not fixed on the wheel hub by threads. They are pressed to be tightly fixed on the wheel hub. Yet the wheel hub is rotatable. Thus the only way for mounting the bolts on the wheel hub is to remove the wheel hub from the axle shaft first and then the old bolts are released from the wheel hub by hammering. Next a fastening tool is used to rotate and press new bolts on the wheel hub gradually.

Refer to US Pat. App. Pub. No. 20130126197 "Reversible Drive Socket or Bit Holder With One-Way Clutch Mechanism", a one-way clutch mechanism 54 typically includes multiple rollers 56, which interact with a cylindrical member that may be inserted in an axial passageway 48. A flange 70 will be seated generally on or generally at the face 50. A clutch housing 46 is fitted over a centerline axis 38. For rotational continuity, the socket holder or assembly 34 must be inserted initially axially into the clutch or clutch assembly 32 to lock or retain the holder 34 for rotation in a first sense, and must be removed and reinserted axially into the opposite side of knob or handle 30 to reverse the effective locked rotational sense of operation. The problem of this device is in that the rollers interact with a cylindrical member that may be inserted in an axial passageway. When the socket holder 34 is rotated, the rollers 56 may be biased due to too much force applied. Then the socket holder 34 is against the rollers 56 so that the rollers 56 got damaged or locked and difficult to rotate. While using the conventional fastening tool, a force is applied to the bolt by the fastening tool for pressing the bolt to move axially and press into the assembly hole of the wheel hub after the bolt being threaded tightly. During the rotation process, a pressure friction occurs between the flange 70 and the handle 30. However, the device with the above structure is unable to solve this problem and the operation is not smooth. Thus users need to take more effort to rotate the fastening tool. Thus there is room for improvement and a need to provide a tool that solves the problem of surface-to-surface pressure friction occurred between the flange 70 and the handle 30 while the projecting section 80 being rotated.

SUMMARY OF THE PRESENT INVENTION

Therefore it is a primary object of the present invention to provide an assembly tool for a wheel hub that features on labor-saving operation and special design for wheel bolts.

In order to achieve the above object, an assembly tool for assembly and replacement of wheel bolts on a wheel hub according to the present invention is formed by a first tool set and a second tool set. The first tool set is composed of a base and a fastener. The base consists of a receiving part formed within the circular body, and a flat surface on the bottom of the receiving part. The flat surface has a first insertion hole while the receiving part is arranged with a pad and a bearing therein. The bearing has a bearing hole and the pad has a pad hole. The bearing is disposed under the pad. Both the bearing and the pad are fixed inside the receiving part by an elastic fastener. The fastener has a hexagonal head. The hexagonal head is extended to form an enlarged part. A cylindrical part is formed by extension of the enlarged part. An axial hole penetrates the hexagonal head, the enlarged part, and the cylindrical part. A part of the axial hole at the cylindrical part is arranged with a thread that is extended to a part of the axial hole at the enlarged part. Both the part of the axial hole at the cylindrical part and the part of the axial hole at the enlarged part are with the thread while a part of the axial hole at the hexagonal head is unthreaded. Moreover, the outer diameter of the cylindrical part matches the diameter of the third insertion hole of the pad and the second insertion hole of the bearing.

The second tool set includes a first arm and a second arm. A first end of the first arm is disposed with a first mounting hole while a first end of the second arm is arranged with a second mounting hole. A second end of the first arm and a second end of the second arm are pivotally connected to each other. Thereby second tool set can be opened and closed by moving the first arm and the second arm. The second end of the second arm is extended and is arranged with a fastening hole.

The base of the first tool set is fitted over the bolt and the cylindrical part of the fastener is mounted into the base. The fastener is engaged with the thread. Then the fastener is rotated to allow the bolt pressingly mounted in the wheel hub. The first arm and the second arm of the second tool set are fastened on one of the bolts on the wheel hub respectively. Then an extension member is connected to the fastening hole of the second arm. Thus the wheel hub can be positioned and unable to rotate due to the extension member locked at one side wall or the edge of a rim of a vehicle. Thereby the assembly of the bolt on the wheel hub is convenient.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
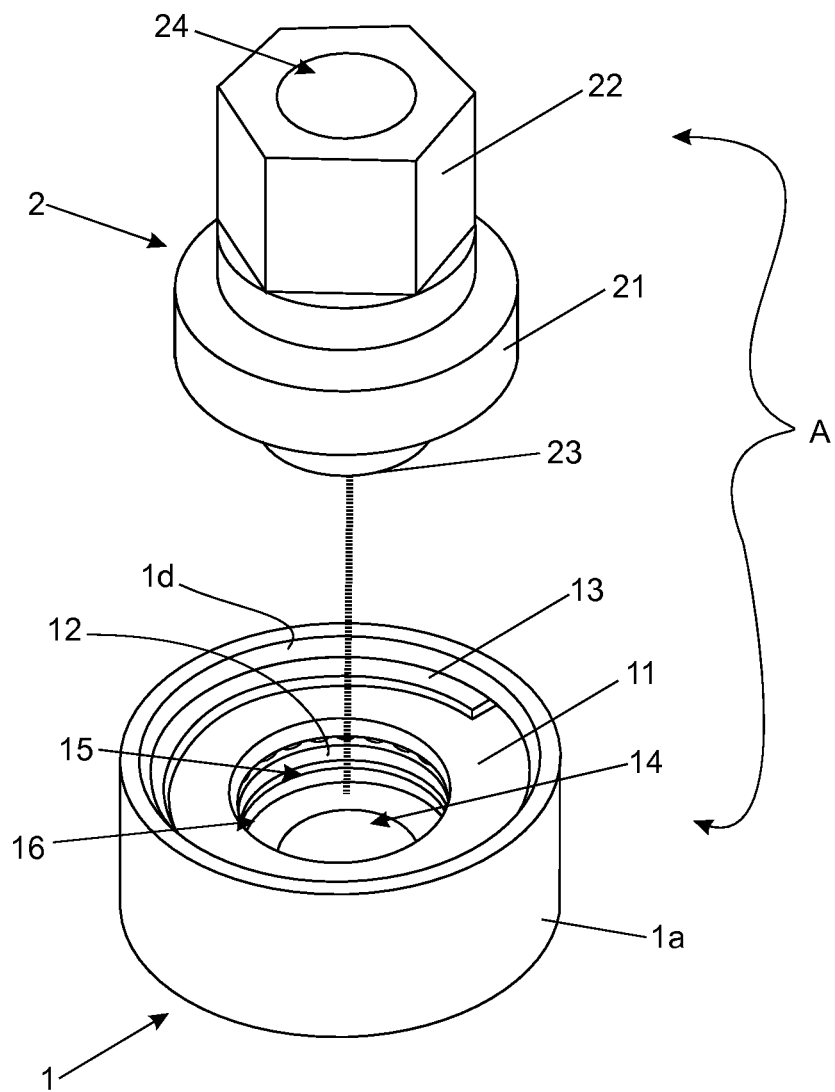
FIG. 1 is an explosive view of a first tool set of an embodiment according to the present invention.
Figure 2:
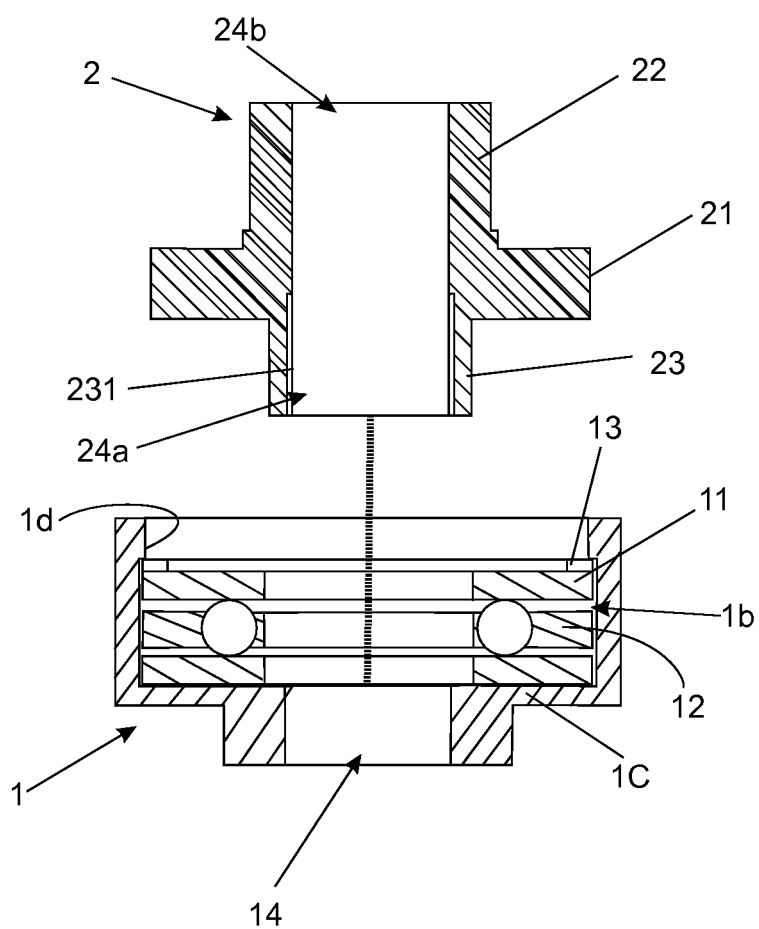
FIG. 2 is a cross sectional view of a first tool set of an embodiment according to the present invention.

Refer from FIG. 1 to FIG. 4, an assembly tool for a wheel hub includes a first tool set A and a second tool set 5. As shown in FIG. 1 and FIG. 2, the first tool set A consists of a base 1 and a fastener 2. The base 1 consists of a circular body 1a surrounding a receiving part 1b, a flat surface 1c on the bottom of the receiving part 1b and a projecting part 1d extended from the top end of the circular body 1a. The flat surface 1c has a first insertion hole 14 while the receiving part 1b is mounted with a pad 11 and a bearing 12 therein. The bearing 12 has a second insertion hole 15 and the pad 11 has a third insertion hole 16. The bearing 12 is disposed under the pad 11. The diameter of the first insertion hole 14 is smaller than the diameter of the second insertion hole 15 and the third insertion hole 16 while the diameter of the second insertion hole 15 is equal to the diameter of the third insertion hole 16.

After the bearing 12 overlapped with the pad 11 and mounted into the receiving part 1b, an elastic fastener 13 is used to fix the bearing 12 and the pad 11 inside the receiving part 1b. The projecting part 1d is for locking and stopping the elastic fastener 13. In detail, the elastic fastener 13 is a ring with a gap made from elastic material. Thus the diameter of the elastic fastener 13 is adjustable-able to be reduced and then turned back to the original size. Thereby the elastic fastener 13 is first compressed to have a smaller diameter and then is mounted between a gap between the pad 11 and the projecting part 1d. Next the diameter of the elastic fastener 13 is recovered to original magnitude to be locked at a lower edge of the projecting part 1d. The inner diameter of the elastic fastener 13 is smaller than the diameter of the pad 11. Thus the pad 11 is stopped by the elastic fastener 13. Both the pad 11 and the bearing 12 are fixed in the receiving part 1b, without falling off. Thereby the pad 11 is locked and stopped in the receiving part 1b by the elastic fastener 13 and is able to rotate due to the bearing 12.

The fastener 2 consists of a hexagonal head 22, an enlarged part 21 formed by extension of the hexagonal head 22, a cylindrical part 23 formed by extension of the enlarged part 21, and an axial hole 24 that penetrates the hexagonal head 22, the enlarged part 21, and the cylindrical part 23. A part of the axial hole 24 at the cylindrical part 23 is arranged with a thread 231 and the thread 231 is extended to a part of the axial hole 24 at the enlarged part 21. Both the part of the axial hole 24 at the cylindrical part 23 and the part of the axial hole 24 at the enlarged part 21 are with the thread 231 while a part of the axial hole 24 at the hexagonal head 22 is a smooth bore. Moreover, the outer diameter of the cylindrical part 23 matches the diameter of the third insertion hole 16 of the pad 11 and of the second insertion hole 15 of the bearing 12.

Figure 4:
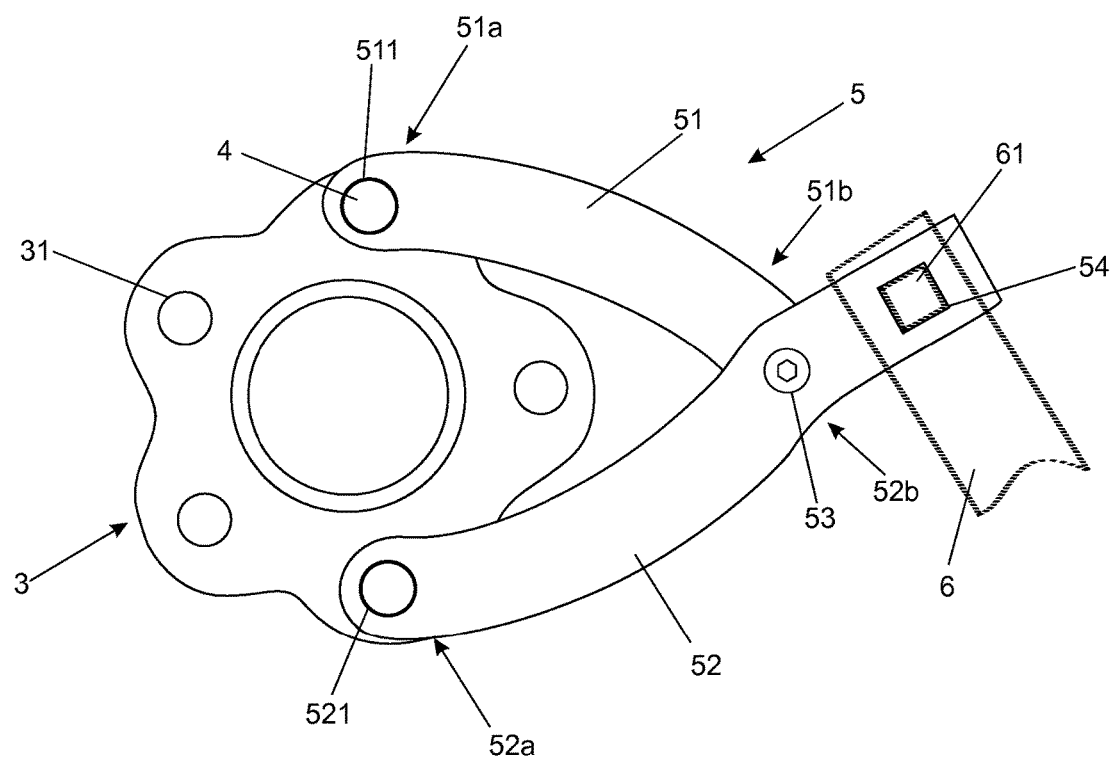
FIG. 4 is a schematic drawing showing a second tool set fastened with bolts of a wheel hub of an embodiment according to the present invention.

As shown in FIG. 4, the second tool set 5 includes a first arm 51 and a second arm 52. A first end 51a of the first arm 51 is disposed with a first mounting hole 511 while a first end 52a of the second arm 52 is arranged with a second mounting hole 521. A second end 51b of the first arm 51 and a second end 52b of the second arm 52 are pivotally connected to each other by a screw 53. Thereby second tool set 5 can be opened and closed by moving the first arm 51 and the second arm 52. The second end 52b of the second arm 52 is extended and is arranged with a fastening hole 54.

Figure 3:
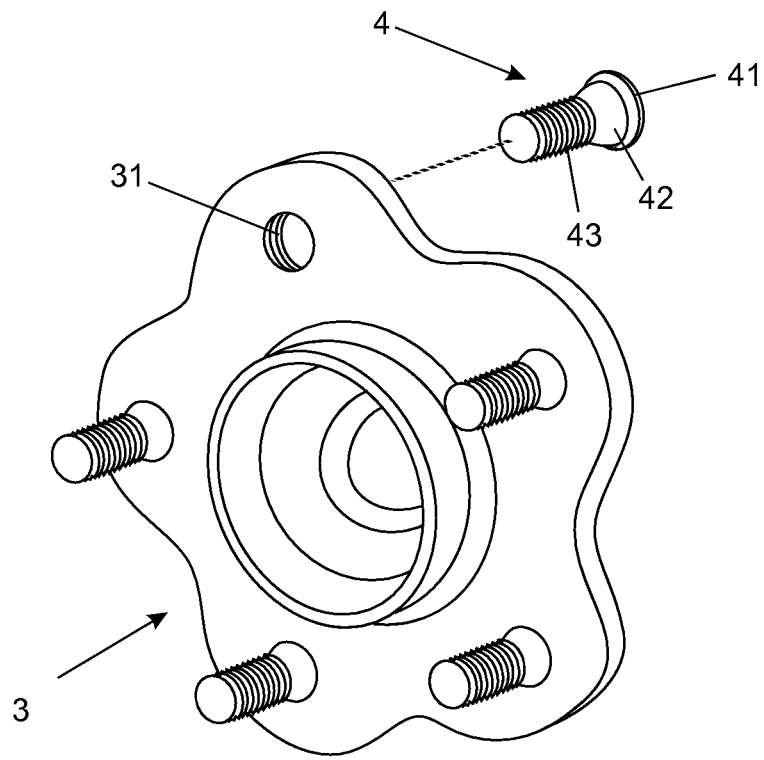
FIG. 3 is a schematic drawing showing a wheel hub assembled with bolts of an embodiment according to the present invention.
Figure 5:
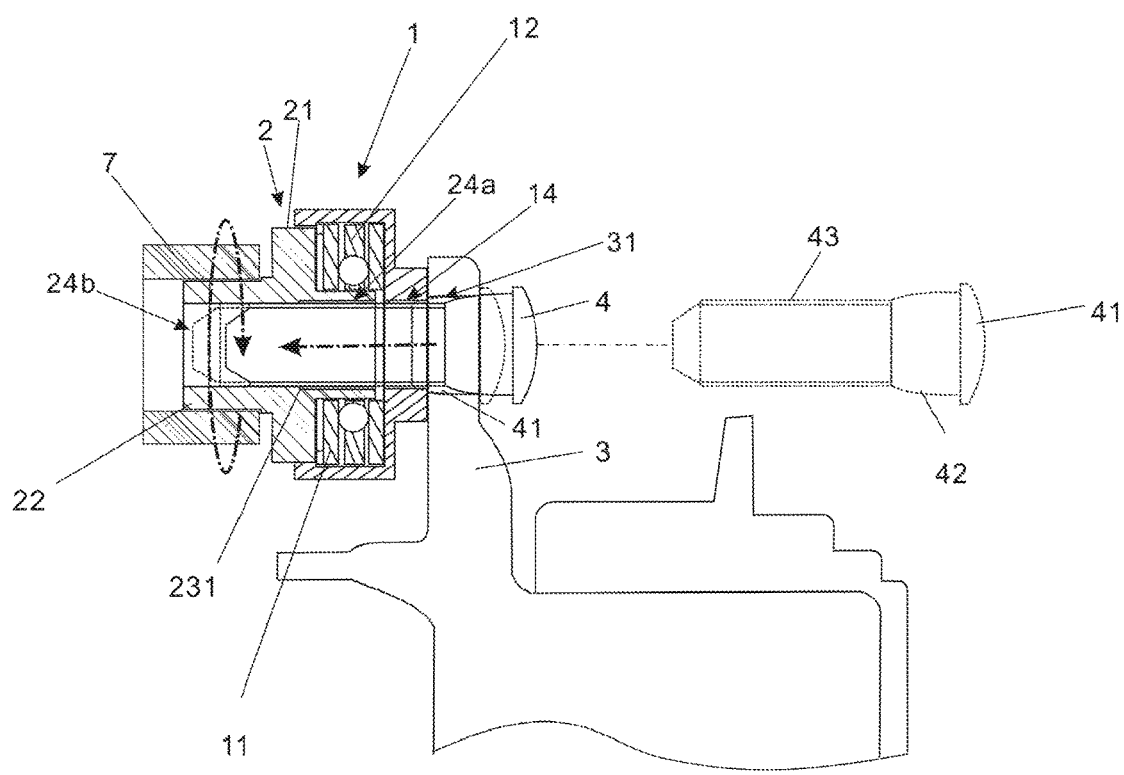
FIG. 5 is a schematic drawing showing a first tool set fitted over a bolt of a wheel hub of an embodiment according to the present invention.

Refer to FIG. 3 and FIG. 5, a structure of a wheel bolt 4 is revealed. The bolt 4 includes a head part 41, an expansion part 42 formed by extension of the head part 41, and a threaded rod 43 formed by extension of the expansion part 42. The threaded rod 43 is used to be engaged with different fasteners. The diameter of the threaded rod 43 is smaller than that of the expansion part 42 and the diameter of the expansion part 42 is smaller than that of the head part 41. The expansion part 42 is a conical frustum. The design of the wheel bolt 4 is based on that the expansion part 42 thereof can be pressed in and tightly connected to an assembly hole 31 of the wheel hub 3. As shown in FIG. 3, the threaded rod 43 of the bolt 4 is inserted through the assembly hole 31 of the wheel hub 3 and the expansion part 42 is pressingly locked and fixed in the assembly hole 31. The maximum outer diameter of the expansion part 42 is a bit larger than the diameter of the assembly hole 31 so that a part of the expansion part 42 with maximum diameter is pressingly fixed in the assembly hole 31. The minimum diameter of the expansion part 42 is smaller than the diameter of the assembly hole 31 to allow a part of the expansion part 42 with minimum diameter being inserted through the assembly hole 31.

The assembly of the bolt 4 is shown in FIG. 4 and FIG. 5. First the first arm 51 and the second arm 52 of the second tool set 5 are fastened on one of the bolts 4 respectively on the wheel hub 3 respectively. Then a fastening part 61 of an extension member 6 is connected to the fastening hole 54 of the second arm 54. Thus the wheel hub 3 can be positioned and locked due to the extension member 6 locked at one side wall or the edge of a rim of a vehicle. Thereby the assembly of the bolt 4 on the wheel hub 3 is convenient.

Furthermore, the threaded rod 43 of the bolt 4 is inserted into the assembly hole 31. The end part of the threaded rod 43 is passed through the first insertion hole 14 of the flat surface 1c, the second insertion hole 15 and the third insertion hole 16 and is extended from the third insertion hole 16. Then the axial hole 24 of the cylindrical part 23 of the fastener 2 is fitted over the threaded rod 43 and the threaded rod 43 is engaged with the thread 231 and continuingly moved axially from a first end 24a to a second end 24b of the axial hole 24. The cylindrical part 23 of the fastener 2 is against a wall of the second insertion hole 15 and of the third insertion hole 16 while a surface 21a of the enlarged part 21 is against a surface 11a of the pad 11. Next a socket tool 7 is fitted over the hexagonal head 22 and the fastener 2 is continuingly rotated to pull the bolt 4 moving axially toward the hexagonal head 22 until the expansion part 42 of the bolt 4 is pressed in and tightly connected to the assembly hole 31 of the wheel hub 31 and the head part 41 of the bolt 4 is against an outer edge of the assembly hole 31.

It should be noted that the pad 11 is able to rotate due to the bearing 12 while the surface 21a of the enlarged part 21 is against the surface 11a of the pad 11 and is also able to rotate. While fitting the socket tool 7 over the hexagonal head 22 for continuingly rotating the fastener 2 and pulling the bolt 4 to move axially toward the hexagonal head 22 more tightly, the pressure friction between the surface 11a and the surface 21a is minimized during the process due to the rotatable surface 21a of the enlarged part 21 against the surface 11a of the pad 11.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An assembly tool for a wheel hub used to assemble and replace bolts on the wheel hub comprising:

a first tool set having a base and a fastener;

the base is a circular body and a receiving part is formed within the circular body; a flat surface is on a bottom of the receiving part; the flat surface has a first insertion hole while the receiving part is arranged with a pad and a bearing therein; the pad has a pad hole; the bearing having a bearing hole and is disposed under the pad; the bearing and the pad are fixed inside the receiving part by an elastic fastener; the pad is able to rotate in the receiving part due to the bearing;

the fastener has a hexagonal head, an enlarged part formed by extension of the hexagonal head, a cylindrical part formed by extension of the enlarged part and an axial hole; the axial hole penetrates the hexagonal head, the enlarged part, and the cylindrical part; a part of the axial hole at the cylindrical part is arranged with a thread that is extended to a part of the axial hole at the enlarged part; both the part of the axial hole at the cylindrical part and the part of the axial hole at the enlarged part are threaded while a part of the axial hole at the hexagonal an unthreaded bore; an outer diameter of the cylindrical part matches a diameter of the pad hole of the pad and a diameter of the bearing hole of the bearing;

a second tool set having a first arm and a second arm; a first end of the first arm is disposed with a first mounting hole while a first end of the second arm is disposed with a second mounting hole; a second end of the first arm and a second end of the second arm are pivotally connected to each other; thereby the second tool set is able to be opened and closed by moving the first arm and the second arm; the second end of the second arm is further disposed with a fastening hole.

2. The device as claimed in claim 1, wherein the first arm and the second arm of the second tool set are arranged for being fastened to one of the bolts on the wheel hub respectively, wherein an extension member is connected to the second arm and is arranged for being locked at one side wall or an edge of a rim of a vehicle so as to prohibit the wheel hub from rotating;

wherein a threaded rod of the bolt is configured for insertion into an assembly hole of the wheel hub, wherein an end part of the threaded rod extends from the pad hole and passes through the first insertion hole, the bearing hole, and the pad hole of the base of the first tool set; wherein the axial hole of the cylindrical part of the fastener is fitted over the threaded rod, wherein the threaded rod is engaged with the thread and the threaded rod is moved axially from a first end of the axial hole to a second end of the axial hole so that the cylindrical part of the fastener is disposed against a wall of the bearing hole and of the pad hole while a surface of the enlarged part is disposed against a surface of the pad; and wherein the fastener is continuously rotated to pull the bolt moving axially toward the hexagonal head, via a socket tool fitted over the hexagonal head, until an expansion part of the bolt is pressed in and tightly connected to an assembly hole of the wheel hub and a head part of the bolt is disposed against an outer edge of the assembly hole.

3. The device as claimed in claim 1, wherein a diameter of the first insertion hole is smaller than a diameter of the bearing hole and a diameter of the pad hole while the diameter of the bearing hole is equal to the diameter of the pad hole.

4. The device as claimed in claim 1, wherein a projecting part is extended from a top end of the circular body.

5. An assembly tool for a wheel hub used to assemble and replace bolts on the wheel hub comprising: a base and a fastener;

wherein the base is a circular body and a receiving part is formed within the circular body; a flat surface is on a bottom of the receiving part and having a first insertion hole while the receiving part is arranged with a pad and a bearing therein; the pad has a pad hole; the bearing having a bearing hole and is disposed under the pad; the bearing and the pad are fixed inside the receiving part by an elastic fastener; the pad is able to rotate in the receiving part due to the bearing;

the fastener has a hexagonal head, an enlarged part formed by extension of the hexagonal head, a cylindrical part formed by extension of the enlarged part and an axial hole; the axial hole penetrates the hexagonal head, the enlarged part, and the cylindrical part; a part of the axial hole at the cylindrical part is arranged with a thread that is extended to a part of the axial hole at the enlarged part; both the part of the axial hole at the cylindrical part and the part of the axial hole at the enlarged part are threaded while a part of the axial hole at the hexagonal head is a smooth unthreaded bore; an outer diameter of the cylindrical part matches with each of a diameter of the pad hole of the pad and a diameter of the bearing hole of the bearing.

6. The device as claimed in claim 5, wherein a diameter of the first insertion hole is smaller than a diameter of the bearing hole and a diameter of the pad hole while the diameter of the bearing hole is equal to the diameter of the pad hole.

7. The device as claimed in claim 5, wherein a projecting part is extended from a top end of the circular body.

8. An assembly tool for a wheel hub used to assemble and replace bolts on the wheel hub comprising: a first tool set and a second tool set;

wherein the first tool set includes a base and a fastener; the base is a circular body and a receiving part is formed within the circular body; a flat surface is on a bottom of the receiving part; the flat surface has a first insertion hole while the receiving part is arranged with a pad and a bearing therein; the pad has a pad hole; the bearing having a bearing hole and is disposed under the pad; the bearing and the to pad are fixed inside the receiving part by an elastic fastener; the pad is able to rotate in the receiving part due to the bearing;

the fastener has a hexagonal head, an enlarged part formed by extension of the hexagonal head, a cylindrical part formed by extension of the enlarged part and an axial hole; the axial hole penetrates the hexagonal head, the enlarged part, and the cylindrical part; a part of the axial hole at the cylindrical part is arranged with a thread; the thread is extended to a part of the axial hole at the enlarged part and stopped at a part of the axial hole at the hexagonal head; the part of the axial hole at the hexagonal head is a smooth bore without the thread;

the second tool set having a first arm and a second arm; a first end of the first arm has a first mounting hole while a first end of the second arm has a second mounting hole; a second end of the first arm and a second end of the second arm are pivotally connected to each other; such that the second tool set is able to be opened and closed by moving the first arm and the second arm; the second end of the second arm has a fastening hole;

the first arm and the second arm of the second tool set are fastened to one of the bolts on the wheel hub respectively; and an extension member is connected to the second arm; thus the wheel hub is positioned and unable to rotate due to the extension member locked at one side wall or an edge of a rim of a vehicle; thereby the wheel hub is able to be assembled with the bolts;

wherein the second tool set is arranged to insert the threaded rod of the bolt into one of assembly holes of the wheel hub; an end part of the threaded rod is passed through the first insertion hole, the bearing hole and the pad hole of the base of the first tool set and then is extended from the pad hole; the axial hole at the cylindrical part of the fastener is fitted over the threaded rod and the threaded rod is engaged with the thread and continuously moved axially from a first end of the axial hole to a second end of the axial hole; the cylindrical part of the fastener is against a wall of the bearing hole and of the pad hole while a surface of the enlarged part is against a surface of the pad; a socket tool is fitted over the hexagonal head and the fastener is continuously rotated to pull the bolt moving axially toward the hexagonal head until the expansion part of the bolt is pressed in and tightly connected to the assembly hole of the wheel hub and a head part of the bolt is against an outer edge of the assembly hole.

* * * * *